United States Patent
Hirose et al.

(10) Patent No.: US 10,047,201 B2
(45) Date of Patent: Aug. 14, 2018

(54) METHOD OF PRODUCING SLIDING MATERIAL FOR WEATHER STRIPS

(71) Applicant: TOYODA GOSEI CO., LTD., Kiyosu-shi, Aichi-ken (JP)

(72) Inventors: Atsuko Hirose, Kiyosu (JP); Yasuhiro Yamaguchi, Kiyosu (JP); Hidekazu Kurimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 36 days.

(21) Appl. No.: 15/305,456

(22) PCT Filed: Aug. 28, 2015

(86) PCT No.: PCT/JP2015/074408
§ 371 (c)(1),
(2) Date: Oct. 20, 2016

(87) PCT Pub. No.: WO2016/052029
PCT Pub. Date: Apr. 7, 2016

(65) Prior Publication Data
US 2017/0044331 A1 Feb. 16, 2017

(30) Foreign Application Priority Data

Sep. 30, 2014 (JP) .................. 2014-200113

(51) Int. Cl.
| | | |
|---|---|---|
| *C08J 3/24* | (2006.01) | |
| *C08L 3/12* | (2006.01) | |
| *C08L 23/16* | (2006.01) | |
| *C08L 23/06* | (2006.01) | |
| *C08L 83/04* | (2006.01) | |
| *C08J 3/00* | (2006.01) | |
| *C08L 23/12* | (2006.01) | |

(52) U.S. Cl.
CPC .............. *C08J 3/24* (2013.01); *C08J 3/005* (2013.01); *C08L 23/06* (2013.01); *C08L 23/12* (2013.01); *C08L 83/04* (2013.01); *C08J 2323/06* (2013.01); *C08J 2323/12* (2013.01); *C08J 2423/06* (2013.01); *C08J 2423/12* (2013.01); *C08J 2423/16* (2013.01); *C08L 2205/02* (2013.01); *C08L 2205/03* (2013.01); *C08L 2312/00* (2013.01)

(58) Field of Classification Search
None
See application file for complete search history.

(56) References Cited

U.S. PATENT DOCUMENTS

| | | | | |
|---|---|---|---|---|
| 8,334,344 B2 * | 12/2012 | Honda | ................... | E06B 7/2314 264/177.1 |
| 2002/0102386 A1 * | 8/2002 | Gopalan | ................... | B60J 10/15 428/141 |
| 2006/0141208 A1 * | 6/2006 | Takase | ................... | C08L 23/16 428/122 |

FOREIGN PATENT DOCUMENTS

| | | |
|---|---|---|
| JP | S61-026643 A | 2/1986 |
| JP | H01-136816 A | 5/1989 |
| JP | H05-078529 A | 3/1993 |
| JP | H07-73893 B2 | 8/1995 |
| JP | H10-193985 A | 7/1998 |
| JP | 2000-327848 A | 11/2000 |
| JP | 2002-020558 A | 1/2002 |
| JP | 2003-213141 A | 7/2003 |
| JP | 4297459 B2 | 7/2009 |
| JP | 2010-024310 A | 2/2010 |
| JP | 2012-117018 A | 6/2012 |
| WO | 2008/007798 A1 | 1/2008 |

OTHER PUBLICATIONS

Machine translation of JP 2012-117018.*
Partial human translation of JP 2012-117018.*
Abstract for CN 101440178 (dated May 2009).*
International Preliminary Report on Patentability of the International Searching Authority dated Apr. 13, 2017 for the corresponding international application No. PCT/JP2015/074408 (and English translation).
International Search Report of the International Searching Authority dated Nov. 10, 2015 for the corresponding International application No. PCT/JP2015/074408 (and English translation).

* cited by examiner

*Primary Examiner* — Marc S Zimmer
(74) *Attorney, Agent, or Firm* — Posz Law Group, PLC

(57) ABSTRACT

PP, an EPDM prior to crosslinking, and PE particles are fed into a twin screw extruder and melt-kneaded so that the EPDM is dynamically crosslinked, whereby a sliding material for weather strips formed of an olefin-based TPV in which the PE particles are dispersed is produced. The amount of the PE particles blended is 10 parts by mass to 90 parts by mass with respect to 100 parts by mass of the total amount of the PP and the EPDM. It is preferable that the PE particles have an average particle diameter of 30 μm to 200 μm before the feeding, and are micronized by the melt kneading to have an average particle diameter of 10 μm to 50 μm in the produced sliding material for weather strips.

15 Claims, 4 Drawing Sheets

FIG. 2A1
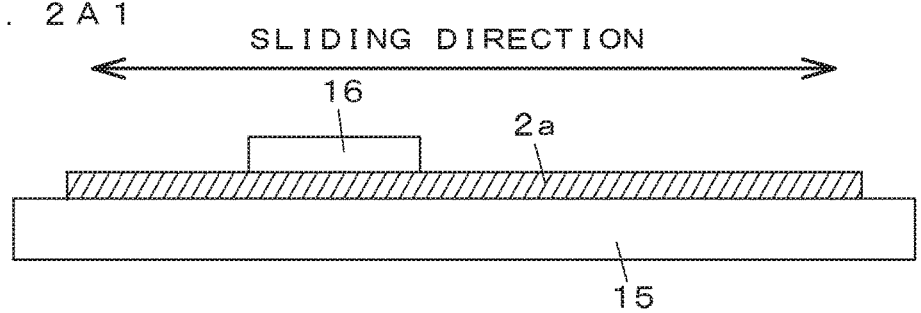
FIG. 2A2
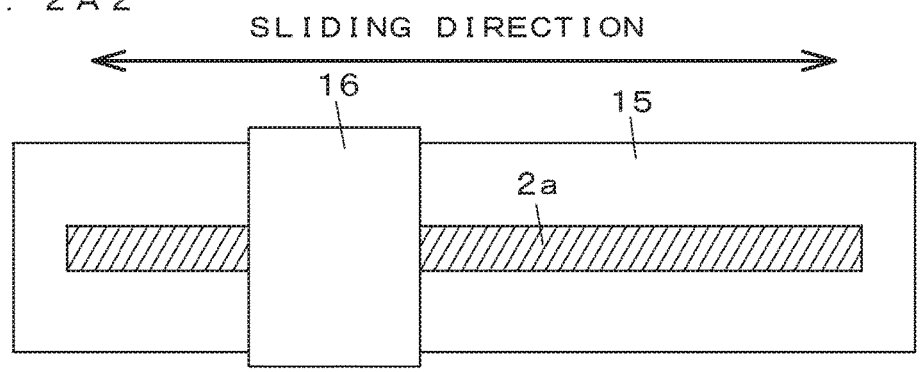
FIG. 2B1
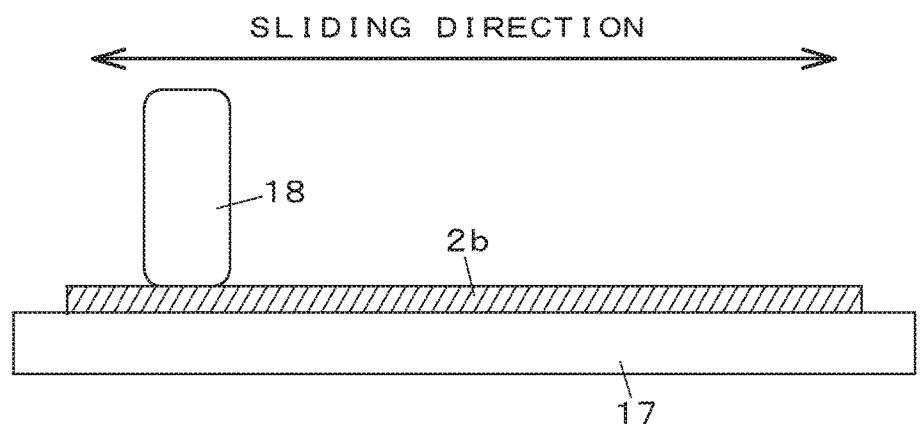
FIG. 2B2
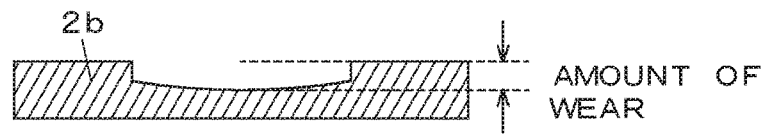

METHOD OF PRODUCING SLIDING MATERIAL FOR WEATHER STRIPS

CROSS REFERENCE TO RELATED APPLICATIONS

This application is a U.S. national stage application of PCT/JP2015/074408 filed on Aug. 28, 2015, which claims priority to Japanese Patent Application No. 2014-200113 filed on Sep. 30, 2014, the contents of which are incorporated herein by reference.

TECHNICAL FIELD

The present invention relates to a method of producing a sliding material for weather strips.

BACKGROUND ART

Weather strips are typically formed of an olefin-based polymer (rubber, thermoplastic resin, or thermoplastic elastomer). In particular, for weather strips, such as a glass run which is attached to a window frame portion so that glass makes sliding contact therewith, an inner weather strip, and an outer weather strip, the following means to improve the glass sliding properties are known.

(1) Addition of Silicone Compound

Patent Document 1 describes a sliding material obtained by extruding a raw material in which 5% by weight to 20% by weight of a silicone compound is blended with an olefin-based polymer, and a weather strip in which the surface portion of the weather strip making sliding contact with glass is molded using the sliding material.

However, although providing sliding properties, a silicone compound also causes the problem that, when the silicone compound is blended in a large amount, the adhesive properties to a molded portion are reduced, and accordingly, a process of cutting out the section is needed.

(2) Mixing of Resin Particles

Patent Document 2 describes a method of producing a weather strip, in which an olefin-based thermoplastic elastomer is used as a material for a weather strip body; a synthetic resin obtained by mixing polyethylene powder or particles with a base material made of an olefin-based resin is used as a material for a thin protective film; and the olefin thermoplastic elastomer and the synthetic resin are co-extrusion-molded using two extruders. Patent Document 2 describes that, since the polyethylene powder or particles to be used have high viscosity and low fluidity, the powder or particles are extrusion-molded with the form thereof being maintained to some extent, and a rough surface portion with fine asperities is formed in the surface of the weather strip.

However, the study of the present inventors indicated the problem that, since a resin was used for the base material for a thin protective film, this caused inferior flexibility.

Patent Document 3 describes a composition produced by blending acrylic modified organopolysiloxane with an olefin-based thermoplastic elastomer formed of a polymer crosslinked by dynamically dispersing and kneading an ethylene-based copolymer rubber in an olefin-based resin, and furthermore by blending at least one particulate powder (having an average particle diameter of 30 μm to 80 μm) selected from polyethylene-based particulate powder, polystyrene-based particulate powder, and acrylic particulate powder with the resulting mixture. In addition, Patent Document 3 describes molding a portion, making sliding contact with glass, of a weather strip by using the composition.

However, the study of the present inventors revealed that sufficient sliding properties were not achieved even using this method.

PRIOR ART DOCUMENTS

Patent Documents

Patent Document 1: WO 2008/007798A1
Patent Document 2: Japanese Examined Patent Publication No. 7-73893
Patent Document 3: Japanese Patent No. 4297459

SUMMARY OF THE INVENTION

Problem to be Solved by the Invention

An object of the present invention is to provide a sliding material for weather strips with a low friction coefficient, low sliding resistance, a small amount of wear, and excellent sliding properties.

Means for Solving the Problem

Thermoplastic elastomers (TPEs) are polymers of thermoplastic resins and rubbers. In particular, a TPE produced by a reactive process, namely, dynamic crosslinking (Dynamic Vulcanization) is a dynamically crosslinked thermoplastic elastomer (TPV: Thermoplastic Vulcanizate). In contrast to a typical process of statically crosslinking-molding a rubber, dynamic crosslinking is a process of melt-kneading a thermoplastic resin and a rubber, and at the same time, crosslinking the rubber with shearing. TPVs have a sea-island structure in which a crosslinked rubber serving as a domain (island phase) is dispersed in a thermoplastic resin serving as a matrix (sea phase). Commonly used for weather strips is an olefin-based TPV obtained by the combination of polypropylene (PP), which is one of olefin-based thermoplastic resins, and an ethylene propylene diene copolymer rubber (EPDM), which is one of olefin-based rubbers.

To examine the method described in Patent Document 3, the present inventors fed dynamically crosslinked olefin-based TPV pellets and polyethylene (PE) particles into an extruder 50 and kneaded and extruded the pellets and the particles as illustrated in FIG. 4 A, and when the inventors observed an extruded olefin-based TPV 52, the particle diameter of EPDM 54 serving as a domain in PP 53 serving as a matrix was not uniform, and also, PE particles 55 were poorly dispersed and the particle diameter of the PE particles 55 was not uniform as schematically illustrated in FIG. 4B. It was considered that such state led to insufficient sliding properties as described above.

On the basis of the above consideration, the present inventors found that kneading of PP, an EPDM prior to crosslinking, and polyethylene (PE) particles allows the dispersibility and size uniformity of the PE particles to be improved. Then, the inventors made a further study and accomplished the present invention.

The present invention provides a method of producing a sliding material for weather strips, the sliding material formed of an olefin-based TPV in which PE particles are dispersed, the method including feeding PP, an EPDM prior to crosslinking, and PE particles into a twin screw extruder and melt-kneading the PP, the EPDM, and the PE particles to dynamically crosslink the EPDM.

Feeding of PP, an EPDM prior to crosslinking, and PE particles into a twin screw extruder allows the PE particles to be easily dispersed in the PP serving as a matrix. Furthermore, through the process of melt-kneading of PP, an EPDM prior to crosslinking, and PE particles via a twin screw extruder, the PE particles are micronized by shearing by the rotation of twin screws, and the diameter of the PE particles is made uniform, and accordingly, the PE particles are more easily dispersed. These PE particles allow the surface of a sliding material for weather strips used in a glass sliding contact portion of a weather strip to be made rough with uniform pitch and uniform protrusion height, and the PE particles reduce an area in contact with glass, whereby the friction coefficient is lowered and the amount of wear is made smaller, and sliding properties are improved.

Here, it is only required that PE particles are fed into a hopper arranged in the first half portion of the screw length of a twin screw extruder wherein dynamic crosslinking of an EPDM has not yet proceeded much. For example, PE particles, PP, and an EPDM prior to crosslinking may be fed into the same hopper at the same time, or PE particles may be fed into a hopper adjacent to a hopper for PP and an EPDM prior to crosslinking.

The amount of the PE particles blended is preferably 10 parts by mass to 90 parts by mass with respect to 100 parts by mass of the total amount of the PP and the EPDM. When the amount of the PE particles blended is less than 10 parts by mass, the friction coefficient and sliding resistance are higher. On the other hand, when the blending amount is more than 90 parts by mass, glass that makes sliding contact is worn more.

It is preferable that the PE particles have an average particle diameter of 30 μm to 200 μm before the feeding, and are micronized by the melt kneading to have an average particle diameter of 10 μm to 50 μm in a produced sliding material for weather strips. This is because, when PE particles are micronized so as to have a particle diameter within this range, the PE particles are uniform in diameter.

Note that the average particle diameter of PE particles of the present invention is obtained in such a manner that, using 9 types of sieves specified by JIS Z8801 (sieve openings: 710 μm, 500 μm, 425 μm, 300 μm, 212 μm, 150 μm, 106 μm, 75 μm, and 53 μm), 100 g of the particles are classified; and the weights of the particles thus-classified and remaining in the sieves are integrated in decreasing order of sieve opening size; and the particle diameter of a particle having 50% weight in the resulting integral curve is measured.

Examples of a material for the PE particles include medium density PE (MDPE), high density PE (HDPE), high molecular weight PE (HMWPE), and ultra-high molecular weight PE (UHMWPE). Among these, UHMWPE is preferable because of its abrasion resistance, which is a few times higher than that of a typical MDPE and the like.

In the sliding material for weather strips, 30 parts by mass or less of a silicone compound may be additionally blended with respect to 100 parts by mass of the total amount of PP and an EPDM to enhance the glass sliding properties. The reason why the amount of a silicone compound blended is 30 parts by mass or less is that, in the case where the sliding material for weather strips is applied to a glass sliding contact portion of a weather strip, adhesion between the glass sliding contact portion and a weather strip body is not impaired. In this case, (1) a silicone compound may be fed into the above-mentioned twin screw extruder to be kneaded together with the PP, the EPDM prior to crosslinking, and the PE particles, or (2) a silicone compound and the olefin-based TPV in which the PE particles are dispersed obtained using the above-mentioned twin screw extruder may be newly fed into a twin screw extruder and melt-kneaded.

Examples of the silicone compound include silicone oil, silicone gum, and a silicone-based copolymer.

Note that, in the sliding material for weather strips, chemicals for the crosslinking of an EPDM (such as a crosslinking agent and a crosslinking accelerator) may be suitably blended, as a matter of course, and besides, other compounds may be suitably blended. Examples of the other compounds include a compatibilizing agent, carbon black, an antioxidant, a processing aid, and a coloring agent.

The sliding material for weather strips is produced so as to preferably have a static friction coefficient of 0.4 or less, a dynamic friction coefficient of 0.2 or less, and a sliding resistance of 10.0 N or less after 50,000 sliding cycles, and more preferably a sliding resistance of 5.0 N or less after 50,000 sliding cycles.

Examples of weather strips for which the sliding material of the present invention is used include a glass run, which is attached to a window frame portion so that glass makes sliding contact therewith, an inner weather strip, and an outer weather strip. In particular, the sliding material of the present invention is suitably used for forming glass sliding contact portions of those weather strips.

Effects of the Invention

According to the present invention, a sliding material for weather strips with a low friction coefficient, low sliding resistance, a small amount of wear, and excellent sliding properties can be provided.

BRIEF DESCRIPTION OF THE DRAWINGS

FIGS. 1A to 1C illustrate a method of producing a sliding material for weather strips according to Examples, wherein FIG. 1A is a schematic diagram illustrating that PP, an EPDM prior to crosslinking, and PE particles are fed into a twin screw extruder to perform melt-mixing, FIG. 1B is a schematic diagram illustrating that olefin-based TPV pellets in which PE particles are dispersed obtained in FIG. 1A and a silicone compound are newly fed into a twin screw extruder to perform melt-kneading, and FIG. 1C is a schematic view illustrating the structure of a sliding material for weather strips obtained in FIG. 1B;

FIG. 2A1 is a side view of the state of an abrasion test, FIG. 2A2 is a sectional view of a test piece after the abrasion test, FIG. 2B1 is a side view of the state of sliding resistance measurement, and FIG. 2B2 is a plan view of the state of the sliding resistance measurement;

FIGS. 4A and 4B illustrate a method of producing a sliding material for weather strips according to Conventional Example, wherein FIG. 4A is a schematic diagram illustrating that an olefin-based TPV after crosslinking and PE particles are fed into a twin screw extruder to perform melt-mixing, and FIG. 4B is a schematic view illustrating the structure of a sliding material for weather strips obtained in FIG. 4A.

MODES FOR CARRYING OUT THE INVENTION

PP, an EPDM prior to crosslinking, and PE particles are fed into a twin screw extruder and melt-kneaded so that the EPDM is dynamically crosslinked, whereby a sliding material for weather strips formed of an olefin-based TPV in which the PE particles are dispersed is produced. The amount of the PE particles blended is 10 parts by mass to 90 parts by mass with respect to 100 parts by mass of the total amount of the PP and the EPDM. It is preferable that the PE particles have an average particle diameter of 30 µm to 200 µm before the feeding, and are micronized by the melt kneading to have an average particle diameter of 10 µm to 50 µm in the produced sliding material for weather strips. A material for the PE particles is preferably an ultra-high molecular weight PE.

In the sliding material for weather strips, 30 parts by mass or less of a silicone compound may be additionally blended with respect to 100 parts by mass of the total amount of the PP and the EPDM. The silicone compound may be fed into the twin screw extruder and kneaded together with the PP, the EPDM prior to crosslinking, and the PE particles. Alternatively, the silicone compound and the olefin-based TPV in which PE particles are dispersed obtained using the twin screw extruder may be newly fed into a twin screw extruder and melt-kneaded.

EXAMPLES

Olefin-based TPVs (sliding materials for weather strips) of Examples 1 to 7 and Comparative Example 1 of the respective formulations shown in the following Table 1 were produced. The values of the formulations represent the amounts in parts by mass of other materials blended with respect to 100 parts by mass of the total amount of PP and an EPDM.

Here, the details of each of the materials areas follows.

PP: block PP, trade name "NOVATEC-PP EC7", manufactured by Japan Polypropylene Corporation EPDM: trade name "EP98", manufactured by JSR Corporation PE particles: UHMWPE particles, trade name "HI-ZEX MILLION 240S" (average molecular weight: approximately 2,000,000, average particle diameter: approximately 120 µm), manufactured by Mitsui Chemicals, Inc.

Compatibilizing agent: trade name "TAFMER 7080", manufactured by Mitsui Chemicals, Inc.

Carbon black: carbon black masterbatch (MB), trade name "MFP-CB45L", manufactured by MITSUFUKU INDUSTRY CO., LTD.

Crosslinking agent: phenol resin, trade name "TACKIROL 250I", manufactured by TAOKA CHEMICAL COMPANY, LIMITED Antioxidant: hindered phenol-based antioxidant, trade name "IRGANOX1010", manufactured by BASF Silicone compound: pellet type silicone, trade name "BY27-001", manufactured by Dow Corning Toray Co., Ltd.

Through the following two steps, the olefin-based TPVs of Examples 1 to 7 and Comparative Example 1 were produced.

(1) Step of Producing an Olefin-Based TPV in which PE Particles are Dispersed

Figure 1A:
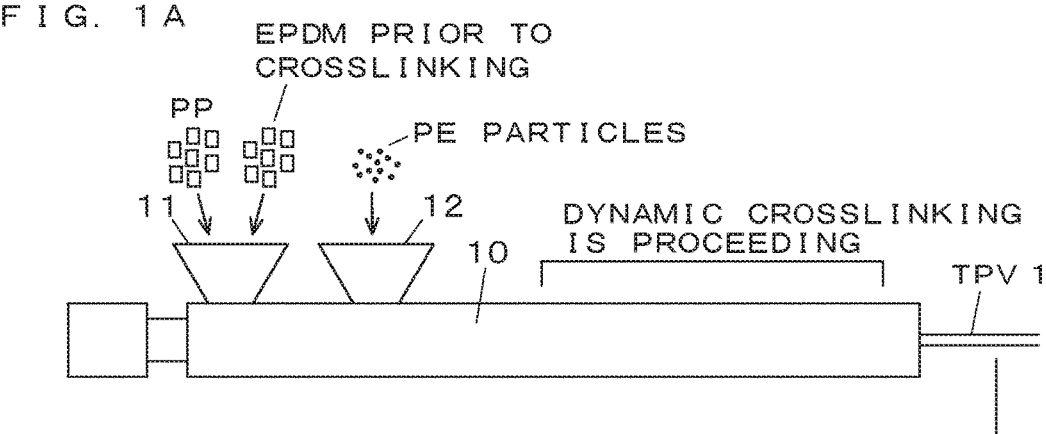

As illustrated in FIG. 1A, PP and an EPDM prior to crosslinking were fed together with a compatibilizing agent, carbon black, a crosslinking agent, and an antioxidant into a first hopper 11 arranged at a base end of a twin screw extruder 10, and PE particles were fed into a second hopper 12 (arranged in the first half portion of the screw length of the twin screw extruder) adjacent to the first hopper 11. During passing through the twin screw extruder 10, the PP,

TABLE 1

| | | Comparative Example 1 | | Example 1 | | Example 2 | | Example 3 | | Example 4 | | Example 5 | | Example 6 | | Example 7 | |
|---|---|---|---|---|---|---|---|---|---|---|---|---|---|---|---|---|---|
| Material (parts by mass) | PP | 64 | | 64 | | 64 | | 64 | | 64 | | 64 | | 64 | | 64 | |
| | EPDM | 36 | | 36 | | 36 | | 36 | | 36 | | 36 | | 36 | | 36 | |
| | PE particles | 0 | | 10 | | 10 | | 40 | | 40 | | 70 | | 86 | | 102 | |
| | Compatibilizing agent | 10 | | 10 | | 10 | | 10 | | 10 | | 10 | | 10 | | 10 | |
| | Carbon black MB | 2.6 | | 2.6 | | 2.6 | | 2.6 | | 2.6 | | 2.6 | | 2.6 | | 2.6 | |
| | Crosslinking agent | 4 | | 4 | | 4 | | 4 | | 4 | | 4 | | 4 | | 4 | |
| | Antioxidant | 0.6 | | 0.6 | | 0.6 | | 0.6 | | 0.6 | | 0.6 | | 0.6 | | 0.6 | |
| | Silicone compound | 5.9 | | 6.4 | | 30 | | 7.9 | | 30 | | 30 | | 10.2 | | 11.1 | |
| | Total Amount | 123.1 | | 133.6 | | 157.2 | | 165.1 | | 187.2 | | 217.2 | | 213.4 | | 230.3 | |
| | Amount of Silicone compound relative to total amount (% by mass) | 4.8 | | 4.8 | | 19.1 | | 4.8 | | 16 | | 14 | | 4.8 | | 4.8 | |
| Normal Physical Properties | Tensile strength [Mpa] | 26.0 | good | 19.1 | good | 17.1 | good | 14.0 | good | 15.8 | good | 16.8 | good | 14.0 | good | 15.1 | good |
| | Elongation [%] | 560 | good | 480 | good | 500 | good | 340 | good | 410 | good | 370 | good | 160 | good | 120 | good |
| | Static friction coefficient [−] | 0.45 | poor | 0.32 | good | 0.36 | good | 0.24 | good | 0.34 | good | 0.30 | good | 0.27 | good | 0.28 | good |
| | Dynamic friction coefficient [−] | 0.19 | good | 0.15 | good | 0.13 | good | 0.14 | good | 0.09 | good | 0.10 | good | 0.14 | good | 0.15 | good |
| | Sliding resistance [N] | 18.2 | poor | 10.0 | good | 8.0 | good | 3.7 | good | 3.5 | good | 3.2 | good | 3.8 | good | 2.9 | good |
| | Amount of wear by glass [mm] | 0.07 | good | 0.04 | good | 0.04 | good | 0.08 | good | 0.08 | good | 0.08 | good | 0.07 | good | 0.108 | fair | the EPDM prior to crosslinking, and the PE particles were melt-kneaded by shearing by the rotation of twin screws so that the EPDM was dynamically crosslinked, whereby an olefin-based TPV 1 in which the PE particles are dispersed was extruded. Then, this olefin-based TPV 1 was pelletized.

Note that all of these materials may be fed into the first hopper 11 together.

Figure 1B:
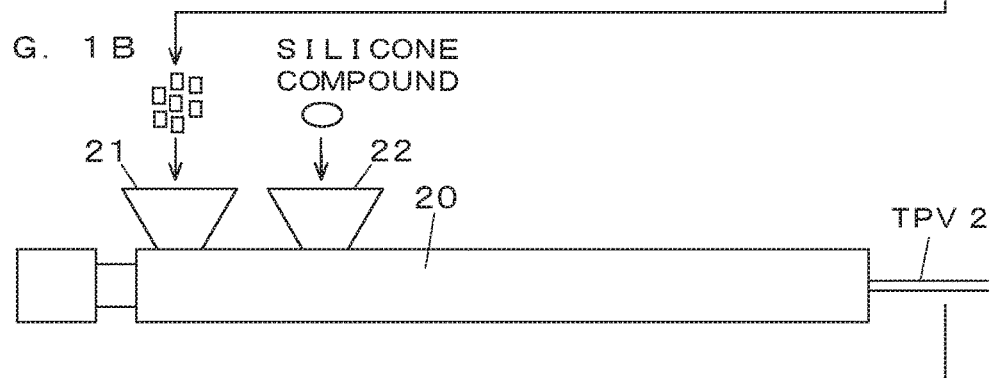

(2) Step of Producing the Olefin-Based TPV Further Containing a Silicone Compound As illustrated in FIG. 1B, the pellets of the olefin-based TPV 1 obtained using the twin screw extruder 10 were newly fed into a first hopper 21 arranged at a base end of a twin screw extruder 20, and a silicone compound was fed into a second hopper 22 adjacent to the first hopper 21, and these materials were kneaded and an olefin-based TPV 2 containing a silicone compound was extruded.

Note that all of these materials may be fed into the first hopper 21 together.

Figure 1C:
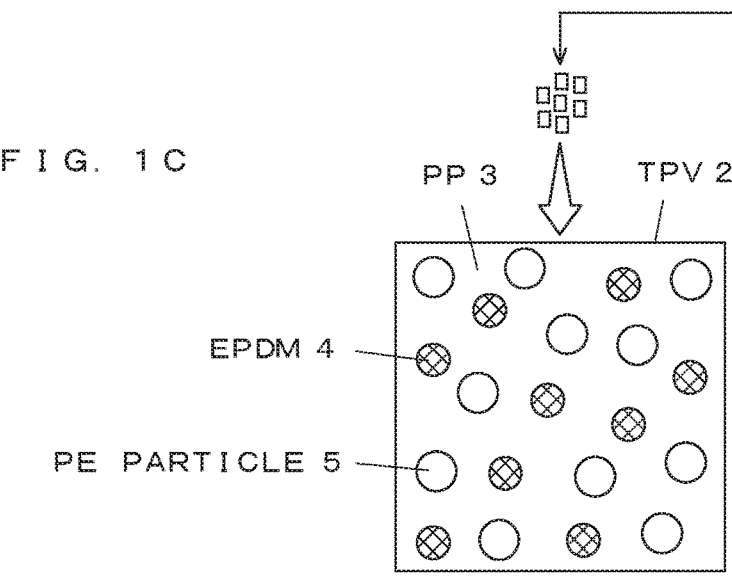
Figure 4A:
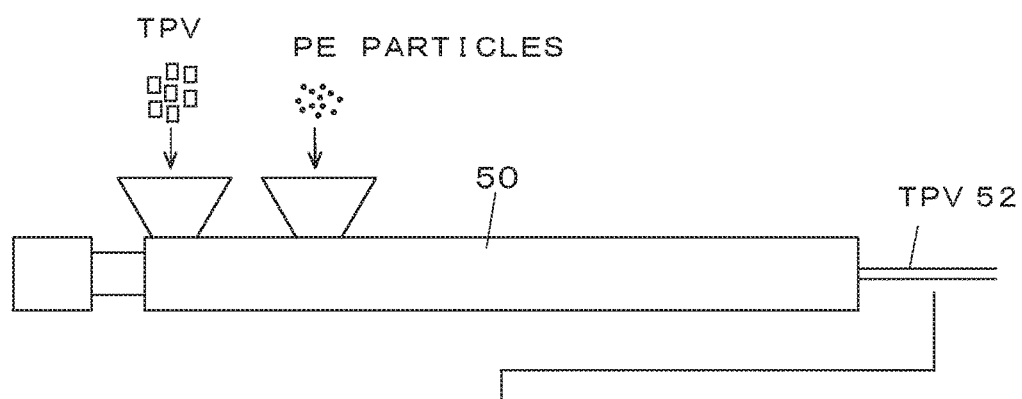
Figure 4B:
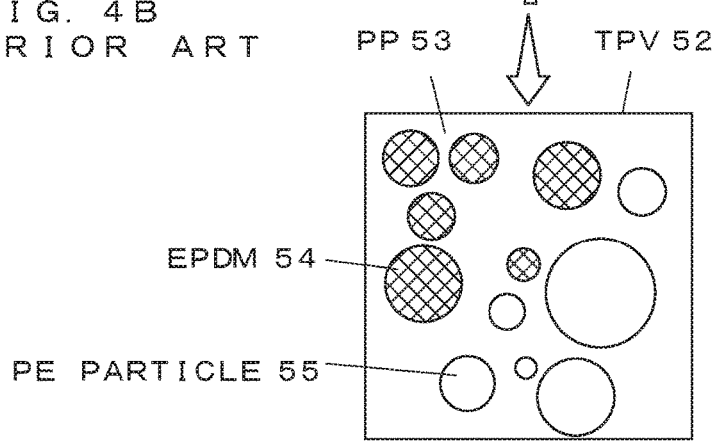

FIG. 1C is an enlarged schematic view of the structure of the produced olefin-based TPV 2 of Examples 1 to 7. The olefin-based TPV 2 of Examples 1 to 7 had a sea-island structure in which EPDM 4 serving as a domain (island phase) was dispersed in PP 3 serving as a matrix (sea phase), and furthermore, PE particles 5 were dispersed in the olefin-based TPV 2. Compared to the above-described Conventional Example illustrated in FIG. 4B, both the EPDM 4 and the PE particles 5 had better dispersibility. The PE particles 5 had an average particle diameter of approximately 120 μm before the feeding, but, were micronized by the melt kneading to have an average particle diameter of approximately 50 μm and be uniform in diameter in the thus-produced olefin-based TPV 2.

The normal physical properties of each of the olefin-based TPVs of Examples 1 to 7 and Comparative Example 1 were tested and measured, and evaluated as follows, and shown in Table 1 above.

1. Tensile Strength and Elongation

In accordance with JIS K6251, a tensile test was carried out at normal temperature to measure tensile strength and elongation (elongation at break). A tensile strength of 6.0 MPa or higher was evaluated as "good", and a tensile strength of lower than 6.0 MPa was evaluated as "poor". An elongation of 70% or higher was evaluated as "good", and an elongation of lower than 70% was evaluated as "poor".

2. Static Friction Coefficient, Dynamic Friction Coefficient

In accordance with JIS K7125, static and dynamic friction coefficients were calculated from loads at the time of movement at 100 mm/min. A static friction coefficient of 0.4 or smaller was evaluated as "good", and a static friction coefficient of larger than 0.4 was evaluated as "poor". A dynamic friction coefficient of 0.2 or smaller was evaluated as "good", and a dynamic friction coefficient of larger than 0.2 was evaluated as "poor".

3. Sliding Resistance

A test piece 2a molded of the olefin-based TPV 2 and having a width of 5 mm, a length of 160 mm, and a thickness of 2 mm was produced, and the test piece 2a was attached onto a holder 15 and set in a testing machine, as illustrated in FIGS. 2A1 and 2A2. A glass abrader plate 16 having a length of 30 mm in the sliding direction was placed on the test piece 2a, and a load of 10 N was applied thereon, and the surface of the test piece 2a was reciprocally slid in the length direction at a sliding velocity of 150 mm/sec. A load in the horizontal direction was measured at the time of the 50,000th reciprocal sliding cycle, and the measured load was regarded as a sliding resistance value. A sliding resistance of 10 N or smaller was evaluated as "good", and a sliding resistance of larger than 10 N was evaluated as "poor".

4. Amount of Wear by Glass

A test piece 2b molded of the olefin-based TPV 2 and having a width of 20 mm, a length of 160 mm, and a thickness of 2 mm was produced, and the test piece 2b was attached onto a holder 17 and set in a testing machine, as illustrated in FIG. 2B1. A glass abrader plate 18 whose bottom surface has a width of 50 mm and a length of 20 mm in the sliding direction (with R =10 mm) was placed on the test piece 2b, and a load of 30 N was applied thereon, and the surface of the test piece 2b was reciprocally slid in the length direction at a sliding velocity of 60 sliding cycles/min. As illustrated in FIG. 2B2, the amount of wear (mm) of the test piece 2b was measured after 10,000 reciprocal sliding cycles. An amount of wear of 0.10 mm or less was evaluated as "good", an amount of wear of more than 0.10 mm and not more than 0.11 mm was evaluated as "fair", and an amount of wear of more than 0.11 mm was evaluated as "poor".

Figure 3A:
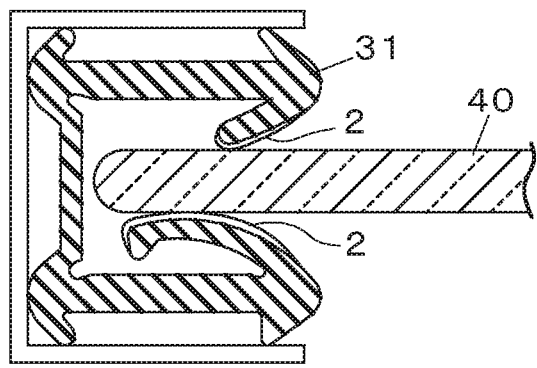
FIG. 3A is a sectional view of a glass run formed by applying a sliding material for weather strips of Examples to a portion, making sliding contact with glass, of a weather strip.
Figure 3B:
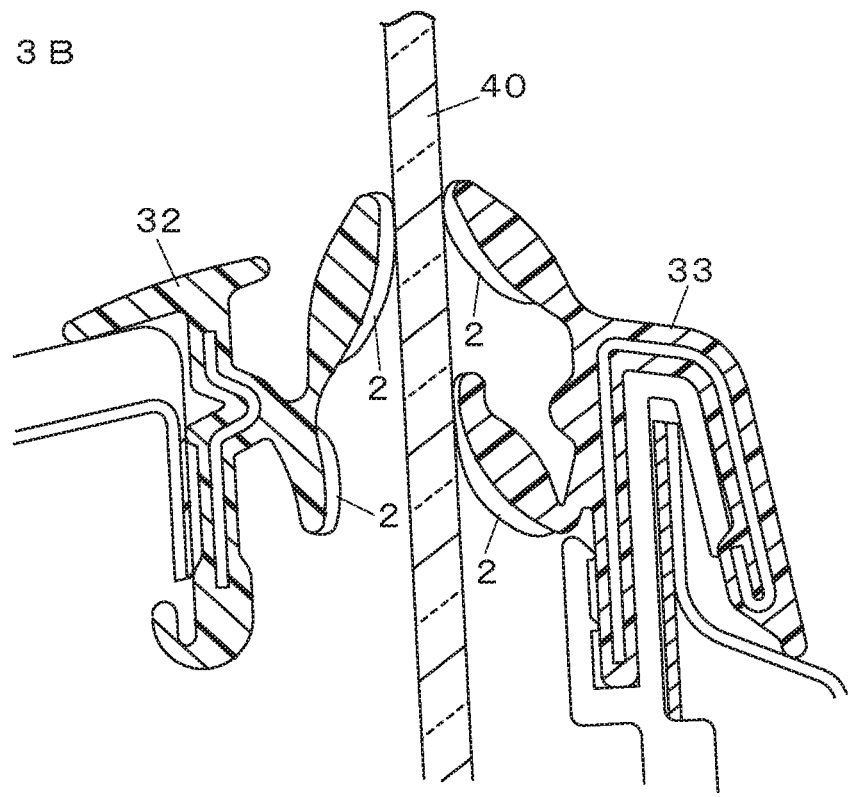
FIG. 3B is a sectional view of an inner weather strip and an outer weather strip formed by applying a sliding material for weather strips of Examples to a portion, making sliding contact with glass, of a weather strip.

Each of the olefin-based TPVs 2 of Examples 1 to 7 may be applied as a sliding material for weather strips, for example, to a portion, making contact with glass 40, of a glass run 31 as illustrated in FIG. 3A, or of an inner weather strip 32 or an outer weather strip 33 as illustrated in FIG. 3B.

Note that the present invention is not limited to Examples above, and suitable modifications may be embodied within the scope not deviating from the gist of the invention.

(1) Although a silicone compound was kneaded in the second step in Examples, a silicone compound may be fed into the twin screw extruder 10 in the first step and kneaded together with the PP, the EPDM prior to crosslinking, and the PE particles.

REFERENCE SIGNS LIST

1 Olefin-based TPV
2 Olefin-based TPV containing a silicone compound
2a Test piece
2b Test piece
3 PP
4 EPDM
5 PE particle
10 Twin screw extruder
11 First hopper
12 Second hopper
15 Holder
16 Glass abrader plate
17 Holder
18 Glass abrader plate
20 Twin screw extruder
21 First hopper
22 Second hopper
31 Glass run
32 Inner weather strip
33 Outer weather strip

The invention claimed is:

1. A method of producing a sliding material for weather strips, the sliding material formed of an olefin-based TPV in which PE particles are dispersed, the method comprising:
   feeding PP, an EPDM prior to crosslinking, and PE particles into a twin screw extruder, and
   melt-kneading the PP, the EPDM, and the PE particles to dynamically crosslink the EPDM,
   wherein the PE particles have an average particle diameter of 30 μm to 200 μm before the feeding, and are micronized by the melt-kneading to have an average particle diameter of 10 μm to 50 μm in a produced sliding material for weather strips.

2. The method of producing a sliding material for weather strips according to claim 1, wherein the PE particles are blended in an amount of 10 parts by mass to 90 parts by mass with respect to 100 parts by mass of the total amount of the PP and the EPDM.

3. The method of producing a sliding material for weather strips according to claim 1 wherein a material for the PE particles is an ultra-high molecular weight PE.

4. The method of producing a sliding material for weather strips according to claim 1, wherein, in the sliding material for weather strips, 30 parts by mass or less of a silicone compound is additionally blended with respect to 100 parts by mass of the total amount of the PP and the EPDM.

5. The method of producing a sliding material for weather strips according to claim 1,
wherein, in the sliding material for weather strips, 30 parts by mass or less of a silicone compound is additionally blended with respect to 100 parts by mass of the total amount of the PP and the EPDM, and
wherein the silicone compound is fed into the twin screw extruder and kneaded together with the PP, the EPDM prior to crosslinking, and the PE particles.

6. The method of producing a sliding material for weather strips according to claim 1, wherein, in the sliding material for weather strips, 30 parts by mass or less of a silicone compound is additionally blended with respect to 100 parts by mass of the total amount of the PP and the EPDM, and
wherein the olefin-based TPV in which PE particles are dispersed obtained using the twin screw extruder and the silicone compound are newly fed into a twin screw extruder and melt-kneaded.

7. A method of producing a sliding material for weather strips, the sliding material formed of an olefin-based TPV in which PE particles are dispersed, the method comprising:
feeding PP, an EPDM prior to crosslinking, and PE particles into a twin screw extruder, and
melt-kneading the PP, the EPDM, and the PE particles to dynamically crosslink the EPDM,
wherein the PE particles are blended in an amount of 10 parts by mass to 90 parts by mass with respect to 100 parts by mass of the total amount of the PP and the EPDM, and
wherein a material for the PE particles is an ultra-high molecular weight PE.

8. The method of producing a sliding material for weather strips according to claim 7 wherein the PE particles have an average particle diameter of 30 μm to 200 μm before the feeding, and are micronized by the melt-kneading to have an average particle diameter of 10 μm to 50 μm in a produced sliding material for weather strips.

9. The method of producing a sliding material for weather strips according to claim 7, wherein, in the sliding material for weather strips, 30 parts by mass or less of a silicone compound is additionally blended with respect to 100 parts by mass of the total amount of the PP and the EPDM.

10. The method of producing a sliding material for weather strips according to claim 7,
wherein, in the sliding material for weather strips, 30 parts by mass or less of a silicone compound is additionally blended with respect to 100 parts by mass of the total amount of the PP and the EPDM, and
wherein the silicone compound is fed into the twin screw extruder and kneaded together with the PP, the EPDM prior to crosslinking, and the PE particles.

11. The method of producing a sliding material for weather strips according to claim 7,
wherein, in the sliding material for weather strips, 30 parts by mass or less of a silicone compound is additionally blended with respect to 100 parts by mass of the total amount of the PP and the EPDM, and
wherein the olefin-based TPV in which PE particles are dispersed obtained using the twin screw extruder and the silicone compound are newly fed into a twin screw extruder and melt-kneaded.

12. A method of producing a sliding material for weather strips, the sliding material formed of an olefin-based TPV in which PE particles are dispersed, the method comprising:
feeding PP, an EPDM prior to crosslinking, and PE particles into a twin screw extruder, and
melt-kneading the PP, the EPDM, and the PE particles to dynamically crosslink the EPDM,
wherein the PE particles are blended in an amount of 10 parts by mass to 90 parts by mass with respect to 100 parts by mass of the total amount of the PP and the EPDM, and
wherein, in the sliding material for weather strips, 30 parts by mass or less of a silicone compound is additionally blended with respect to 100 parts by mass of the total amount of the PP and the EPDM.

13. The method of producing a sliding material for weather strips according to claim 12 wherein the PE particles have an average particle diameter of 30 μm to 200 μm before the feeding, and are micronized by the melt-kneading to have an average particle diameter of 10 μm to 50 μm in a produced sliding material for weather strips.

14. The method of producing a sliding material for weather strips according to claim 12 wherein the silicone compound is fed into the twin screw extruder and kneaded together with the PP, the EPDM prior to crosslinking, and the PE particles.

15. The method of producing a sliding material for weather strips according to claim 12 wherein the olefin-based TPV in which PE particles are dispersed obtained using the twin screw extruder and the silicone compound are newly fed into a twin screw extruder and melt-kneaded.

* * * * *